(12) United States Patent
Lewis et al.

(10) Patent No.: US 12,072,830 B2
(45) Date of Patent: Aug. 27, 2024

(54) FLEXIBLE HIGH SPEED INTERFACE IMPLEMENTATION IN A POWER SUPPLY

(71) Applicant: Infineon Technologies Austria AG, Villach (AT)

(72) Inventors: David R. Lewis, Reading, MA (US); Paul M. Gitahi, Signal Hill, CA (US); Suejong Choi Perranoski, Rancho Palo Verdes, CA (US); Mattia Oddicini, Redondo Beach, CA (US); Scott W. Southwell, Seal Beach, CA (US); Robert Reissfelder, Westwood, MA (US)

(73) Assignee: Infineon Technologies Austria AG, Villach (AT)

( * ) Notice: Subject to any disclaimer, the term of this patent is extended or adjusted under 35 U.S.C. 154(b) by 7 days.

(21) Appl. No.: 17/527,424

(22) Filed: Nov. 16, 2021

(65) Prior Publication Data
US 2023/0153263 A1   May 18, 2023

(51) Int. Cl.
*G06F 13/42* (2006.01)
*G06F 1/26* (2006.01)
*G06F 13/40* (2006.01)

(52) U.S. Cl.
CPC ............ *G06F 13/4282* (2013.01); *G06F 1/26* (2013.01); *G06F 13/4022* (2013.01)

(58) Field of Classification Search
CPC .......... G06F 1/26; G06F 1/28; G06F 9/30106; G06F 13/1605; G06F 13/166;
(Continued)

(56) References Cited

U.S. PATENT DOCUMENTS 6,038,400 A * 3/2000 Bell ..................... G06F 13/4291
710/16
6,138,180 A * 10/2000 Zegelin ................. G06F 13/102
710/72

(Continued)

FOREIGN PATENT DOCUMENTS

CN          102480264 A       5/2012
CN          104503942 B   *  10/2017
(Continued)

OTHER PUBLICATIONS

European Extended Search Report, EP 22 20 7247, Mar. 23, 2023, pp. 1-9.

*Primary Examiner* — Thomas J. Cleary
(74) *Attorney, Agent, or Firm* — Armis IP Law, LLC

(57) ABSTRACT

An apparatus includes processing hardware, storage hardware, and serial communication hardware. The processing hardware receives selection of a serial communication protocol. The serial communication protocol is selected amongst multiple serial communication protocols to control operation of a power converter. Via the processing hardware or other suitable entity, the storage hardware is populated with a set of command decode functions (a.k.a., command descriptors) assigned to the selected serial communication protocol. During operation, the serial communication hardware receives commands over a serial communication interface and executes the received commands via the set of command decode functions in the storage hardware. Each of the multiple commands communicated over the serial communication interface is encoded in accordance with the selected serial communication protocol. The serial communication hardware uses the set of command decode functions to execute the received commands.

30 Claims, 13 Drawing Sheets

(58) Field of Classification Search
CPC .. G06F 13/382; G06F 13/387; G06F 13/4022; G06F 13/4063; G06F 13/4282; G06F 9/30196; G06F 13/1663
See application file for complete search history.

(56) References Cited

U.S. PATENT DOCUMENTS

| | | | | |
|---|---|---|---|---|
| 6,168,077 | B1* | 1/2001 | Gray | G06K 19/07733 235/375 |
| 6,439,464 | B1* | 8/2002 | Fruhauf | G06K 19/07 235/492 |
| 6,851,014 | B2* | 2/2005 | Chang | G06F 13/4243 713/2 |
| 7,032,045 | B2* | 4/2006 | Kostadinov | H04L 9/40 710/72 |
| 7,249,213 | B2* | 7/2007 | Feng | G11C 5/066 710/305 |
| 7,535,917 | B1* | 5/2009 | Son | H04L 69/323 370/469 |
| 7,922,091 | B2* | 4/2011 | Deprun | G06K 7/0008 235/491 |
| 8,032,261 | B1* | 10/2011 | Beauchamp | G06F 1/206 318/599 |
| 9,276,488 | B2* | 3/2016 | Eriksen | H02M 5/458 |
| 9,772,970 | B2* | 9/2017 | Luo | G06F 13/4295 |
| 9,960,811 | B1* | 5/2018 | Gaide | H04B 3/548 |
| 11,455,269 | B1* | 9/2022 | Valmonte | G06F 1/26 |
| 2003/0023795 | A1* | 1/2003 | Packwood | H04L 69/18 710/105 |
| 2003/0085713 | A1* | 5/2003 | Krampitz | H01M 10/48 324/426 |
| 2003/0093598 | A1* | 5/2003 | Park | H04M 1/72409 710/63 |
| 2004/0164170 | A1* | 8/2004 | Krygier | G07F 7/1008 235/492 |
| 2005/0005045 | A1* | 1/2005 | Kim | G06K 19/07733 710/74 |
| 2006/0129724 | A1* | 6/2006 | Kostadinov | H04L 9/40 710/106 |
| 2008/0086576 | A1* | 4/2008 | Schauer | G06F 13/387 710/5 |
| 2009/0037641 | A1* | 2/2009 | Bresniker | G06F 13/1694 711/E12.001 |
| 2009/0043935 | A1* | 2/2009 | Huomo | G06K 19/07 710/301 |
| 2011/0072185 | A1* | 3/2011 | Pinto | G06F 13/387 710/316 |
| 2011/0229131 | A1* | 9/2011 | Izenberg | H04Q 11/00 398/45 |
| 2013/0121346 | A1* | 5/2013 | Mitchell | H04L 12/4625 370/465 |
| 2013/0297842 | A1* | 11/2013 | Liu | G06F 13/385 710/105 |
| 2014/0129748 | A1* | 5/2014 | Muth | H04L 12/4135 710/106 |
| 2015/0370751 | A1* | 12/2015 | Perrine | G06F 13/385 710/106 |
| 2016/0016096 | A1* | 1/2016 | Fisher | A63J 99/00 700/90 |
| 2018/0262595 | A1* | 9/2018 | Perchlik | H04L 69/03 |
| 2020/0177409 | A1* | 6/2020 | Galchenko | H04L 12/2807 |
| 2020/0195759 | A1* | 6/2020 | Brouse | H04L 69/18 |
| 2021/0157758 | A1* | 5/2021 | Turpin | H04L 67/12 |

FOREIGN PATENT DOCUMENTS

| | | |
|---|---|---|
| CN | 109739143 A | 5/2019 |
| CN | 209402534 U | 9/2019 |
| CN | 111198841 A | 5/2020 |
| CN | 113098873 A | 7/2021 |
| WO | 0215486 A2 | 2/2002 |

* cited by examiner

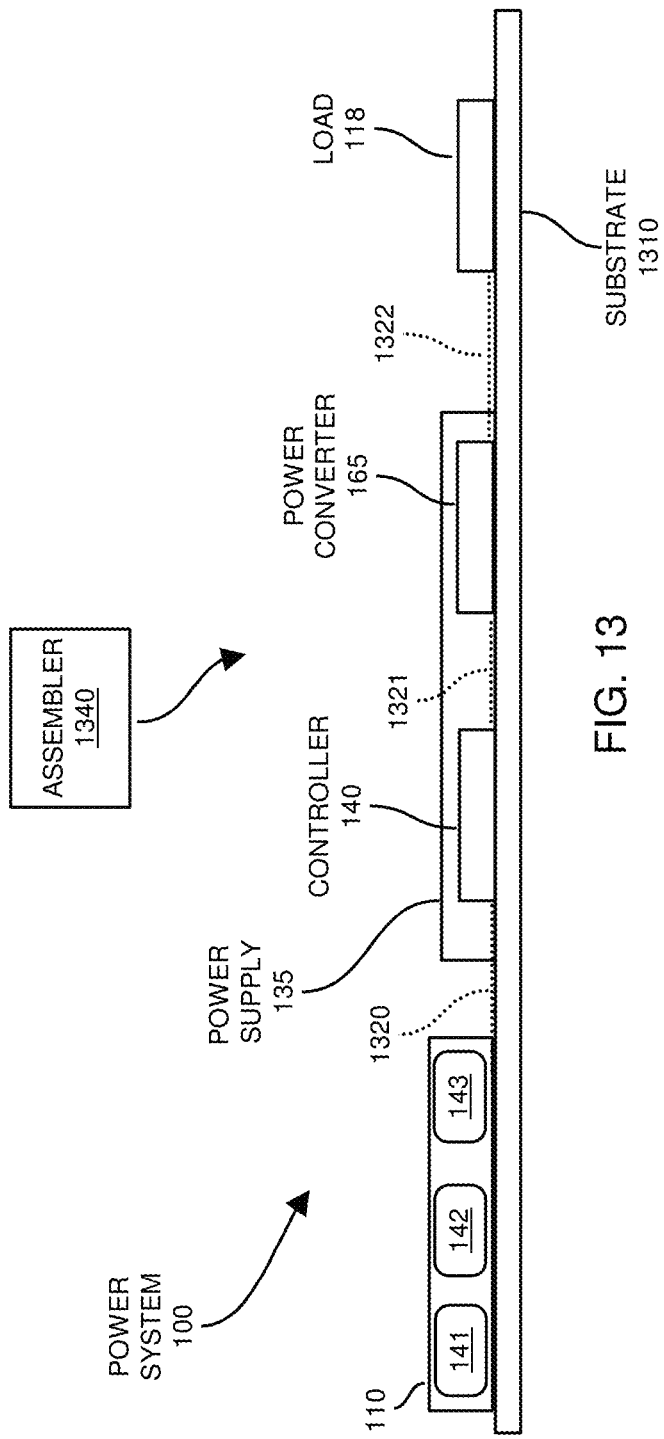

FLEXIBLE HIGH SPEED INTERFACE IMPLEMENTATION IN A POWER SUPPLY

BACKGROUND

One type of conventional power converter is a voltage regulator. In general, to maintain an output voltage within a desired range, a controller in the voltage regulator compares the magnitude of a generated output voltage to a setpoint reference voltage. Based on a respective error voltage derived from the comparison, the controller modifies a respective switching frequency and/or pulse width modulation associated with activating high side switch circuitry and low side switch circuitry in the voltage regulator.

Conventional power converters can be configured to receive a voltage value (such as a so-called VID value) indicating a desired output voltage setting. The VID voltage value may vary over time depending on system operation. The conventional voltage regulator uses the VID value as the setpoint reference voltage. Accordingly, a device generating the VID value is able to control a magnitude of the output voltage.

One way to communicate (convey) VID voltage settings to a controller is a high speed serial communication link. The conventional high speed communication link can be used for any commands such as setting voltage level, retrieval of status information, etc. The high speed serial communication link can be implemented via one of many different conventional protocols.

BRIEF DESCRIPTION

Implementation of clean energy (or green technology) is very important to reduce human impact on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator or voltage source.

Regardless of whether energy is received from green energy sources or non-green energy sources, it is desirable to make most efficient use of raw energy (such as storage and subsequent distribution) provided by such sources to reduce our impact on the environment. This disclosure contributes to reducing our carbon footprint and providing better use of energy via more efficient energy conversion.

This disclosure further includes the observation that conventional implementation of serial interface management suffers from deficiencies. For example, as previously discussed, multiple different serial interface protocols exist in the multiphase voltage regulator space to set the output voltage. A respective implemented serial communication protocol and specification for setting the output voltage from the CPU can vary widely between various applications.

Currently there are three different competing specifications with different IO, protocol, and register spaces to accommodate CPU VID control. Implementing all three of these into one ASIC (Application Specific Integrated Circuit) circuit creates issues with space due to the large number of registers for each protocol. Customers often change the specifications of a respective serial communication protocol. So when a new serial protocol is implemented in RTL via conventional techniques, the respective ASIC circuit needs to be modified each time a protocol change is made. There is no way to enhance downstream customers supported features after the specification is implemented in an ASIC design.

Embodiments herein include novel ways of implementing different control interfaces.

More specifically, embodiments herein include an apparatus including processing hardware, storage hardware, and serial communication hardware. The processing hardware is operative to receive selection of a serial communication protocol, the serial communication protocol selected amongst multiple serial communication protocols to control operation of a power converter. Via the processing hardware or other suitable entity, the storage hardware of the communication management system is populated with a set of command decode functions assigned to the selected serial communication protocol. Yet further, during operation, the serial communication hardware receives commands over a serial communication interface and executes the received commands via the set of command decode functions in the storage hardware. Each of the multiple commands communicated over the serial communication interface is encoded in accordance with the selected serial communication protocol.

In further example embodiments, the processing hardware is operative to map an identity of the selected serial communication protocol supported by the communication management system to the set of command decode functions. The serial communication hardware or other suitable entity then retrieves the selected set of command decode functions from a repository of multiple sets of command decode functions. The set of command decode functions are stored in the storage hardware.

Each of the multiple sets of command decode functions available for retrieval from the repository supports a different selectable serial communication protocol. For example, a first set of command decode functions stored in the repository are configured to support execution of commands associated with a first serial communication protocol; a second set of command decode functions stored in the repository are configured to support execution of commands associated with a second serial communication protocol; a third set of command decode functions in the repository are configured to support execution of commands associated with a third serial communication protocol; and so on.

Thus, embodiments herein include a repository that stores multiple available sets of command decode functions. Each set of the command decode functions in the repository is associated with a different serial communication protocol selectable for storage in the storage hardware.

As previously discussed, the serial communication hardware can be programmable depending on the selected serial communication protocol. For example, further embodiments herein include, via the processing hardware or other suitable entity, selecting a configuration of the serial communication hardware from multiple possible instances of implementing the serial communication hardware, each of which supports a different serial communication protocol. As previously discussed, the selected serial communication hardware (such as circuit, logic, etc.) and corresponding functionality uses the corresponding command decode functions stored in the storage hardware to execute the received commands.

In still further example embodiments, the apparatus as discussed herein can be configured to include an arbiter operative to provide connectivity between the serial communication hardware and the storage hardware. The arbiter provides multiple entities including the serial communication hardware access to the storage hardware and data associated with the command decode functions implemented by the selected serial communication protocol. As its name suggests, in one embodiment, the arbiter manages access by the multiple entities to the stored data.

Further embodiments herein include telemetry management hardware. The telemetry management hardware receives status information associated with the power converter and stores it in appropriate data fields of the storage hardware. The arbiter provides different entities access to the status information (telemetry data).

In further example embodiments, a portion of the storage hardware (such as volatile memory, non-volatile memory, etc.) is pre-selected (or pre-allocated) to store one of the multiple sets of command decode functions as previously discussed depending on the selected serial communication protocol. Further, as previously discussed, each of the multiple sets of command decode functions supports execution of commands associated with a different set of command decode functions.

In yet further example embodiments, during operation of receiving commands over the serial communication interface after configuration of the storage hardware and communication management system in general, assume that the serial communication hardware receives a first command over a serial communication link from an entity controlling operation of the power converter; the first command is encoded in accordance with the selected serial communication protocol. In such an instance, the serial communication hardware maps the first command to an appropriate command (particular) decode function in the set of command decode functions stored in the storage hardware; the particular command decode is assigned to (or configured to) execute the first command. The serial communication hardware executes the first command via the particular command decode function.

In one embodiment, the serial communication hardware is further operative to initiate storage of the data associated with the received command in a data field of the particular command decode function or a data field as determined from executing the particular command decode function.

As previously discussed, the stored data in the data fields of the command decode functions, corresponding remote registers, etc., may be accessed by different entities to facilitate control or at least learn of operating conditions associated with the power converter (such as a voltage converter).

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: receive selection of a serial communication protocol, the serial communication protocol selected amongst multiple serial communication protocols to control operation of a power converter; populate storage hardware with a set of command decode functions assigned to the selected serial communication protocol; and enable serial communication hardware to receive commands over a serial communication interface and execute the commands via the set of command decode functions in the storage hardware.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more voltage converters to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a further summary of embodiments) and corresponding figures of the present disclosure as further discussed below.

BRIEF DESCRIPTION OF THE DRAWINGS

FIG. 13 is an example diagram illustrating assembly of a circuit according to embodiments herein.

Figure 1:
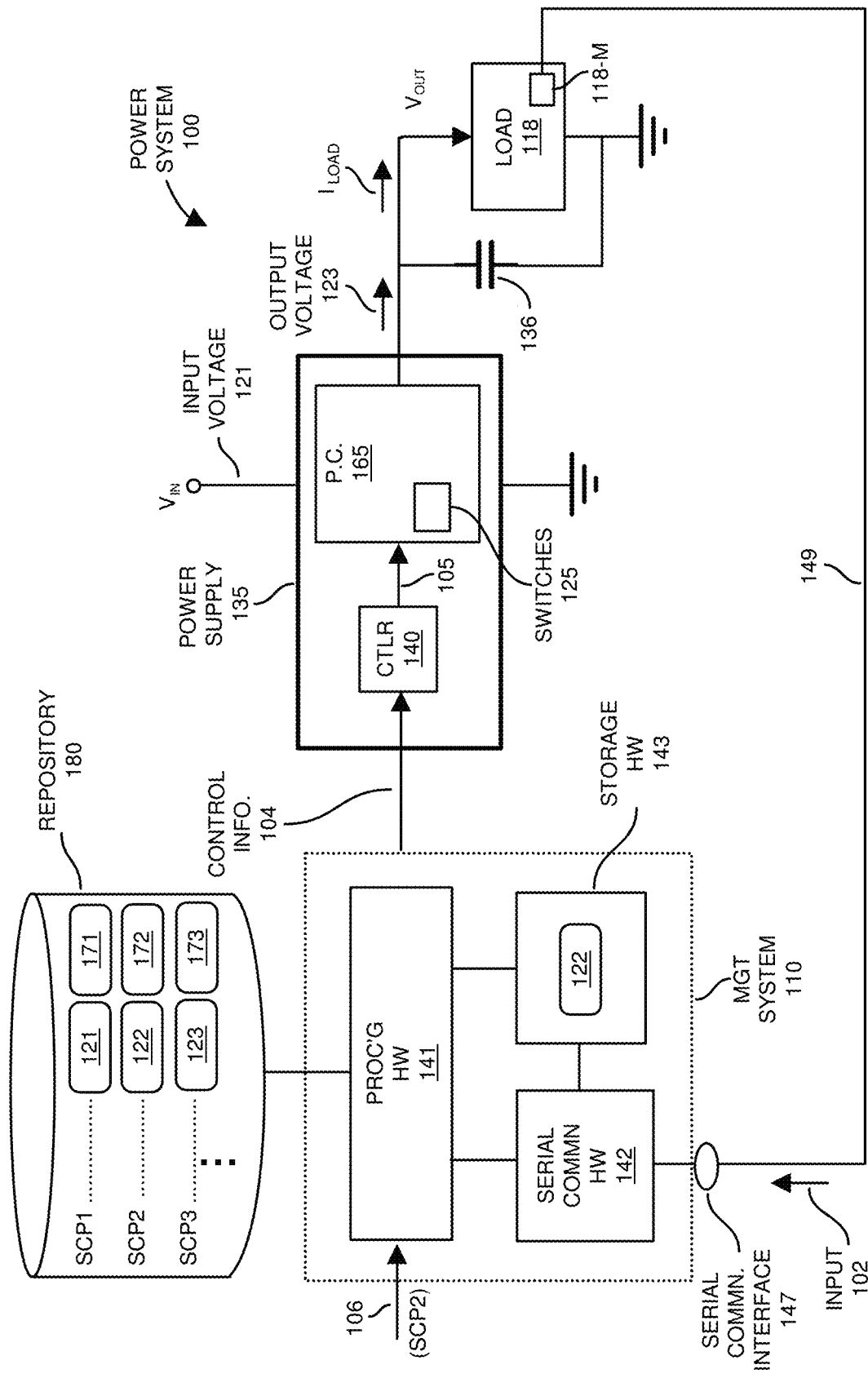
FIG. 1 is an example general diagram of a power supply and implementation of a selectable serial communication protocol and corresponding configured serial communication hardware according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein include implementing a high speed interface to control a power supply including one or more phases. For example, in one embodiment, a flexible hardware/firmware interface (such as serial communication hardware) is proposed to provide a way to implement firmware based protocol commands for multiple high speed (50 MHz) serial interfaces to control a multiphase regulator. The architecture is lightweight and saves on physical registers by virtualizing the registers to a common storage format for each of multiple different serial interface specifications. Note that embodiments herein are extendable to any suitable serial interface protocol.

In one nonlimiting example embodiment, the apparatus (such as a management system) includes processing hardware, storage hardware, and serial communication hardware. The processing hardware is operative to receive selection of a serial communication protocol. The serial communication protocol can be selected from amongst multiple serial communication protocols to control operation of a power converter.

Via processing hardware or other suitable entity, the storage hardware is populated with a set of command decode functions (a.k.a., command descriptors) assigned to the selected serial communication protocol. Serial communication hardware is configured to process commands encoded in accordance with the selected serial communication protocol. During operation, each of the multiple commands received over the serial communication interface is encoded in accordance with the selected serial communication protocol. The serial communication hardware/firmware receives commands over a configured serial communication interface and executes the received commands via the set of command decode functions in the storage hardware.

Now, more specifically, FIG. 1 is an example general diagram of a power supply and implementation of a selectable serial communication protocol and corresponding serial communication hardware according to embodiments herein.

In this example embodiment, the power system 100 includes (communication) management system 110, repository 180, power supply 135, and dynamic load 118. Power supply 135 includes controller 140 and power converter 165. Power converter 165 of power supply 135 includes one or more switches 125 controlled by the controller 140 via control signals 105.

In one embodiment, prior to operation, the processing hardware 141 of the management system 110 configures the serial communication hardware 142 based on a selected type of serial communication interface 147 implemented between the load manager 118-M and the management system 110. Management system 110 supports multiple different types of serial communication protocols. Input signal 106 indicates the selected type of serial communication protocol (SCP2 in this case).

Further in this example embodiment, the input 106 indicates selection of the serial communication protocol SCP2 amongst the different possible serial communication protocols SCP1, SCP2, SCP3, etc.

In response to detecting the selection of the serial communication protocol SCP2, prior to receiving input 102, the processing hardware 141 maps the selected serial communication protocol SCP2 to the corresponding set of command decode functions 122 and decode map information 172 stored in repository 180. In general, as its name suggests, each of the command decode functions in the set 122 (associated with the series circuit path SCP2) supports decoding of a respective received command (via series circuit path SCP2) for proper execution. For commands received in accordance with the series circuit path SCP2 in this embodiment, the map information 172 provides a way of mapping a respective unique received command to the appropriate command decode function in the set that is configured to perform the received unique command. Thus, a combination of the set of command decode functions and map information 172 aid in translation and execution of the received commands. The processing hardware 141 stores the command decode functions 122 (and potentially map information 172) in storage hardware 143. In one embodiment, as shown, storage of the set of command decode functions 122 in the storage hardware 143 includes configuring the storage hardware 143 with the set of command decode functions 122. Thus, subsequent to identification of the appropriate map information and set of command decode functions associated with a series circuit path supported by the serial communication interface 147, the processing hardware 141 is easily able to map, via the corresponding map information, a respective received command to the appropriate command decode function for execution of the respective received command. The command decode function indicates details of executing the received command. Additional details of using a set of command decode function and corresponding map information are discussed with respect to the following FIGS.

Additionally, as further discussed herein, the processing hardware 141 configures the serial communication hardware 142 to support the selected serial communication protocol SCP2 via map information 172. The map information 172 can be stored in any suitable location.

As further shown, dynamic load 118 includes the load manager 118-M. Load manager 118 communicates input 102 to the serial communication hardware 142 over the serial communication link 149 and corresponding serial communication interface 142 associated with the management system 110. Input 102 from load manager 118-M or other suitable entity remotely located with respect to the load 118 includes commands to retrieve status information (data), commands to control operation of generating the output voltage 123, etc. Load manager 118-M can be implemented by an entity at any suitable location.

Serial communication hardware 142 processes the received input 102 and generates corresponding control information 104 communicated to the controller 140. In one embodiment, the controller 140 uses the control information 104 to generate/control the output voltage 123.

For example, via control of switches 125 based at least in part on the control information 104 produced by the management system 110, the controller 140 produces control signals 105 to control operation of the power converter 165. Based on the control signals 105, the power converter 165 converts the input voltage 121 (such as any suitable DC input voltage) into the output voltage 123 (such as any suitable DC output voltage). The output voltage 123 (Vout) and corresponding generated output current (i.e., LOAD) supply power to the load 118.

As further discussed herein, the controller 140 controls generation of the output voltage 123 based on current operational conditions of the power supply 135 and load 118. For example, in addition to receiving the control information 104, the controller 140 receives feedback such as the output voltage 123 from the power supply 135. Via one or more control loops, the controller 140 maintains a magnitude of the output voltage 123 in accordance with settings as specified by the control information 104.

Figure 2:
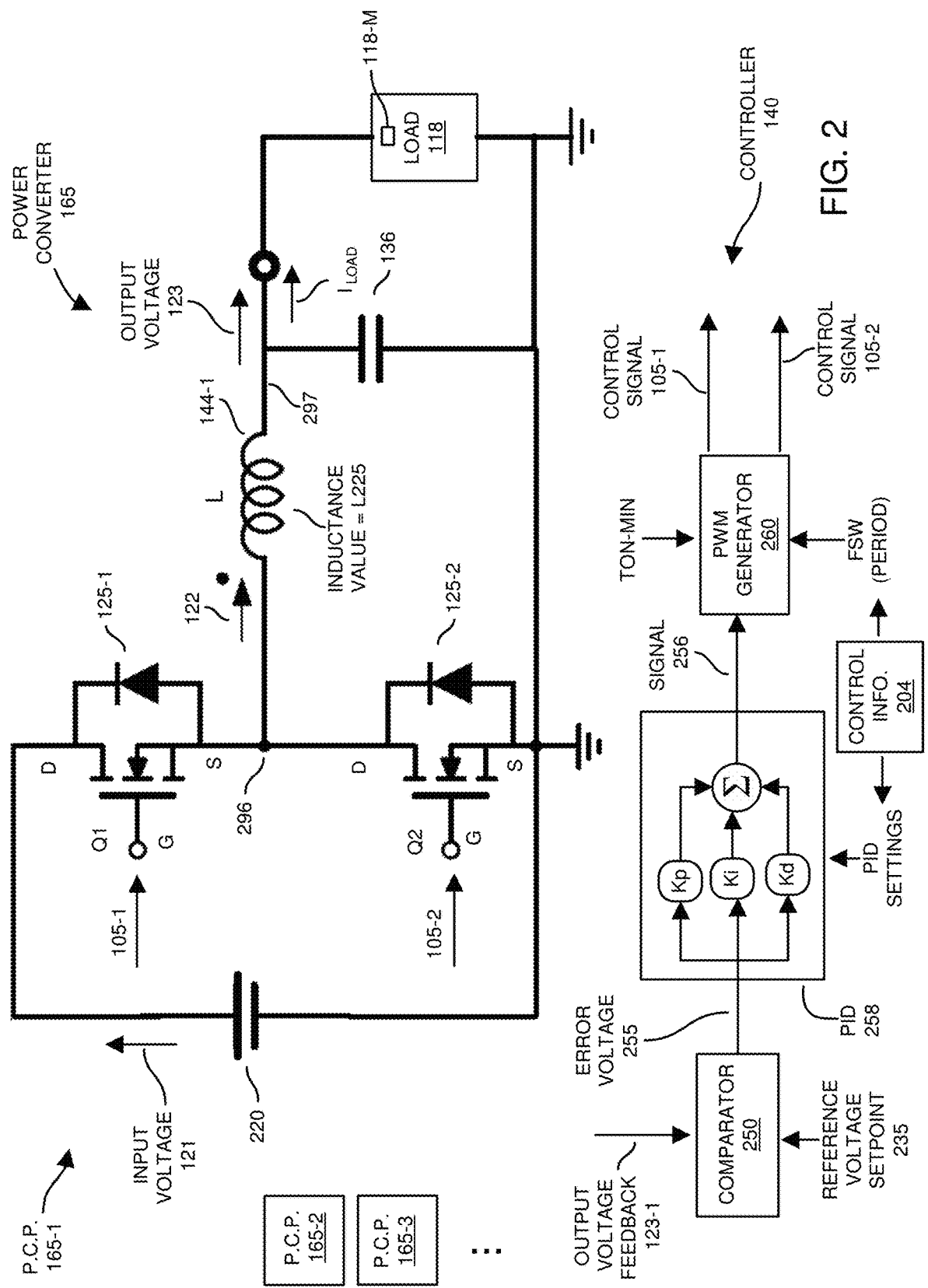
FIG. 2 is an example diagram illustrating operation of a power converter and corresponding generation of an output voltage according to embodiments herein.

FIG. 2 is an example diagram illustrating operation of a power converter and generation of an output voltage according to embodiments herein.

As previously discussed, the power converter 165 and corresponding power supply 135 can be configured as any suitable type of power converter or power converter system.

In this non-limiting example embodiment, the power converter 165 includes multiple power converter phases 165-1, 165-2, 165-3, etc. The power converter phase 165-1 (and other power converter phases) are configured as a buck converter. Power converter phase 165-1 includes voltage source 220 (providing input voltage 121), switch Q1 (high side switch circuitry 125-1), switch Q2 (low side switch circuitry 125-2), inductor 144-1, and output capacitor 136 (such as one or more capacitors).

Switches 125 (Q1, Q2, etc.) can be implemented in any suitable manner. In one embodiment, each of the switches 125 is a so-called field effect transistor. Any suitable type of switches 125 can be used to provide switching as discussed herein.

As previously discussed, the power supply 100 includes any number of power converters 165 (voltage regulators such as power converter 165-1, power converter 165-2, etc.) disposed in parallel and out of phase to produce the output voltage 123. Each voltage converter such as power converter 165-2, power converter phase 165-3, etc., operates in a similar manner as power converter 165-1. The power converters 165 can be operated in or out of phase with respect to each other.

Although the power converter 165-1 in FIG. 2 is shown as a buck converter configuration, note again that the power converter 165 can be instantiated as any suitable type of voltage converter and include any number of phases, providing regulation of a respective output voltage 123 as described herein.

As further shown in this example embodiment, the switch Q1 (a.k.a., high side switch circuitry 125-1) of power converter phase 165-1 is connected in series with switch Q2 between the input voltage source 220 and corresponding ground reference.

For example, the drain node (D) of the switch Q1 is connected to the voltage source 220 to receive input voltage 121. The switch controller 140 drives the gate node (G) of switch Q1 with control signal 105-1.

The source node (S) of the switch Q1 is connected to the drain node (D) of the switch Q2 at node 296. The switch controller 140 drives the gate node (G) of switch Q2 with control signal 105-2. The source node (S) of the switch Q2 is connected to ground. As previously discussed, the power converter 165-1 further includes inductor 144-1. Inductor 144-1 (value=L255) extends from the node 296 to node 297 of the output capacitor 136 and dynamic load 118.

Via switching of the switches Q1 and Q2 via respective control signal 105-1 (applied to gate G of switch Q1) and control signal 105-2 (applied to gate G of switch Q2), the node 296 coupling the source (S) node of switch Q1 and the drain (D) node of switch Q2 provides output current through the inductor 144, resulting in generation of the output voltage 123 and corresponding output current $I_{LOAD}$ powering the load 118 and energizing capacitors 136.

In general, the magnitude of the current $I_{LOAD}$ is equal to a magnitude of the output current through inductor 144-1. Output capacitor 136 reduces a ripple voltage associated with the output voltage 123.

In further example embodiments, as previously discussed, the controller 140 controls switching of the switches Q1 and Q2 based on one or more feedback parameters. For example, the controller 140 can be configured to receive output voltage feedback signal 123-1 derived from the output voltage 123 supplied to power the load 118. The output voltage feedback signal 123-1 can be the output voltage 123 itself or a proportional derivative voltage value thereof using a resistor divider.

Via the comparator 250, the controller 140 compares the output voltage feedback signal 123-1 (such as output voltage 123 itself or derivative, or proportional signal) to the reference voltage setpoint 235. As previously discussed, the reference voltage setpoint 235 is a desired setpoint in which to control a magnitude of the output voltage 123 during load-line regulation implemented by the power supply 135.

In one embodiment, the load manager 118-M in or associated with the dynamic load 118 provides control information or feedback (such as a VID value) indicating a desired reference voltage setpoint 235. In other words, the load manager 118-M or other suitable entity communicating over the serial communication link 149 can be configured to provide feedback/commands to the controller 140 indicating a magnitude in which to produce the output voltage 123. In further example embodiments, the feedback and/or commands such as VID value or other information from the load manager 118-M (or other suitable entity) is used to produce the reference voltage setpoint 235.

As further shown, the amplifier or comparator 250 associated with the controller 140 produces a respective error voltage 255 based on a difference between the output voltage feedback signal 123-1 and the reference voltage 235. A magnitude of the error voltage 255 generated by the amplifier or comparator 250 varies depending upon the degree to which the magnitude of the output voltage 123 is in or out of regulation (with respect to the reference voltage setpoint 235).

In one non-limiting example embodiment, the controller 140 includes PID controller 258 (control function). The PID controller 258 includes one or more of a P-component (Proportional component), I-component (Integral component), and a D-component (Derivative component) as known in the art to control operation of switches 125 (Q1 and Q2). In voltage mode control, the output of the PID can proportionally control the duty cycle or ON-time of the PWM, and the PWM pulses may be generated at a fixed or variable switching period or frequency. In current mode control, the output of the PID sets the target average current or peak current in the inductor 144-1, and the PWM pulse is dependent on the current sense information, such that the duty cycle or ON time of the PWM is generated based on the PID output and the current sense, with the PWM pulses being generated at fixed or variable switching period or frequency.

In further example embodiments, the control information 204 associated with the controller 140 includes PID settings (so-called tuning parameters such as gain value Kp applied to the P-component stage, a gain value Ki applied to the I-component stage, and a gain value Kd applied to the D-component stage). Note that the PID settings (gain value Kp, gain value Ki, gain value Kd) depending on the embodiment.

As further shown, the PWM (Pulse Width Modulation) generator 260 of the controller 140 controls operation of switching the switches Q1 and Q2 based upon the magnitude of the signal 256 (such as control output) from the PID controller 258.

For example, in general, if the error voltage 255 (and control signal 256) indicates that the output voltage 123 (of the power converter 165-1) becomes less than a magnitude of the reference voltage setpoint 235, the PWM generator 260 increases a duty cycle or frequency of activating the high side switch Q1 (thus decreasing a duty cycle of activating the low-side switch Q2) in a respective switch control cycle.

Conversely, if the error voltage 256 indicates that the output voltage 123 (of the power converter 165-1) becomes greater than a magnitude of the reference voltage setpoint 235, the PWM generator 260 decreases a duty cycle or frequency of activating the high side switch circuitry Q1 (thus increasing a duty cycle of activating the low-side switch Q2) in a respective switching control cycle.

As is known in the art, the controller 140 controls each of the switches Q1 and Q2 ON and OFF at different times to prevent short-circuiting of the input voltage 121 to the ground reference voltage. For example, for a first portion of the control cycle, when the switch Q1 is activated to an ON state, the switch Q2 is deactivated to an OFF state. Conversely, when the switch Q1 is deactivated to an OFF state, the switch Q2 is activated to an ON state.

Note that the controller 140 (via PWM generator 260) implements a dead time (both switches Q1 and Q2 OFF) between state ON-OFF and OFF-ON state transitions to prevent shorting of the input voltage 121 to the ground reference.

Via variations in the pulse with modulation (and/or frequency modulation) of controlling the respective switches Q1 and Q2, the controller 140 controls generation of the output voltage 123 such that the output voltage 123 remains within a desired voltage range with respect to the reference voltage setpoint 235.

The magnitude of current 122 through the inductor 144-1 increases when the high-side switch Q1 (such as one or more field effect transistor or other suitable component) is ON and low-side switch Q2 (such as one or more field effect transistor or other suitable component) is OFF; the magnitude of current 122 through the inductor 144-1 decreases when the high-side switch Q1 is OFF and Q2 is ON.

Figure 3:
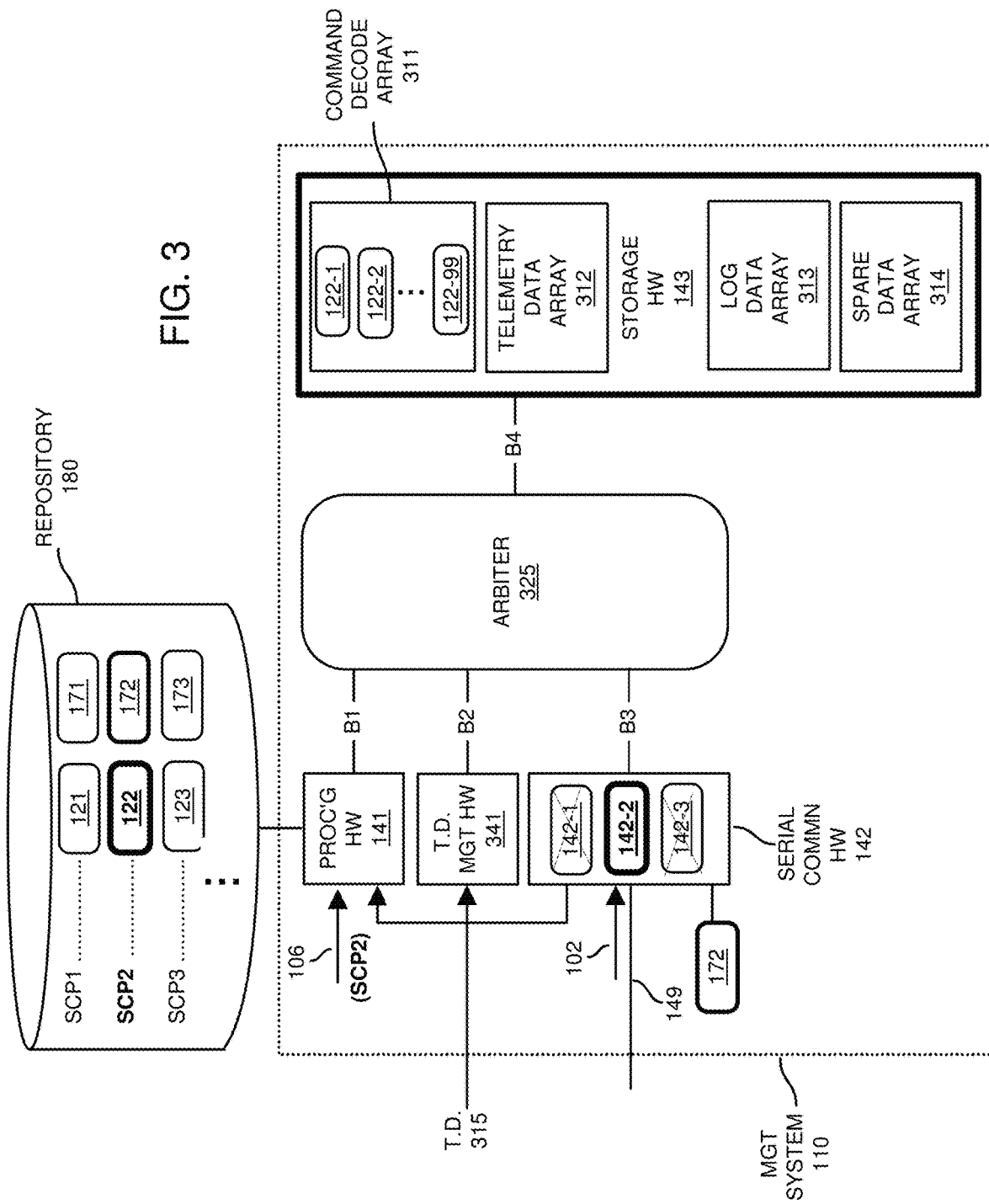
FIG. 3 is an example diagram illustrating detected selection of a second serial communication protocol and corresponding programming of serial communication hardware according to embodiments herein.

FIG. 3 is an example diagram illustrating detected selection of a second serial communication protocol and corresponding programming of serial communication hardware according to embodiments herein.

In one embodiment, the serial communication hardware 142 and/or other components of the management system 110 are implemented via an ASIC (Application Specific Integrated Circuit).

Since these interfaces are very fast, such as at or around 50 MHz digital or any other suitable setting, control is implemented to support the speed of the protocol decode and implementing each of these protocols can take 1 Kbyte of register space per loop and per interface. In one embodiment, as previously discussed, one instance of the serial communication hardware 142 (such as serial communication hardware 142-2) is activated depending on the selected serial communication protocol.

Using custom AHB masters in the physical serial interface and a shared RAM (such as storage hardware 143) between modules, the register space associated with the different serial communication protocols can be virtually mapped to the same portion of storage hardware 143, conserving die area. For example, each of the selected serial communication protocols uses the same space (command decode array 311) to store respective command decode functions. The use of the storage hardware 143 (such as RAM based registers)

allows for firmware descriptors (a.k.a., command decode functions) to be used to control protocol types. Use of RAM provides the lowest latency access of the payload data for the processing hardware 141 or other entities accessing the data stored in the command decode functions.

Thus, as previously discussed, embodiments herein include configuring the serial communication hardware 142 depending on the selected serial communication protocol SCP2 as indicated by the control input 106.

For example, serial communication hardware 142 includes any number of circuits to process communications according to a selected serial communication protocol. More specifically, in one embodiment, the serial communication hardware includes: i) first serial communication hardware 142-1 (such as one or more of first logic, circuitry, instructions, etc.) to support the first serial communication protocol SCP1; ii) second serial communication hardware 142-2 (such as one or more of second logic, circuitry, instructions, etc.) to support the second serial communication protocol SCP2; iii) third serial communication hardware 142-3 (such as one or more of third logic, circuitry, instructions, etc.) to support the third serial communication protocol SCP3; and so on.

In this example embodiment, based on the setting of input 106 indicating selection of the serial communication protocol SCP2, the processing hardware 141 implements serial communication hardware 142-2 because it supports processing and execution of the selected serial communication protocol SCP2.

Further, because the serial communication protocol SCP2 is selected, the processing hardware 141 programs the selected serial communication hardware 142-2 to use map information 172, which is stored at any suitable location. Map information 172 provides a mapping of received commands over the serial communication hardware 142-2 to command decode functions 122 in the storage hardware 143.

In further example embodiments, the storage hardware 143 (such as non-volatile memory, volatile memory, disk, buffer, repository, etc.) is partitioned (such as pre-partitioned) to store different types of data. For example, in one embodiment, the storage hardware 143 includes a first partition such as command decode array 311 to store the selected set of command decode functions; the storage hardware 143 includes a second partition such as command decode array 312 to store telemetry data associated with the power supply 100; the storage hardware 143 includes a third partition such as log data array 313 to store log data associated with the power supply 100; the storage hardware 143 includes a third partition such as command decode array 314 to store spare data associated with the power supply 100; and so on.

In one embodiment, as previously discussed, a portion of the storage hardware 143 such as command decode array 311 is pre-selected to store the selected set of command decode functions.

In response to detecting the selection of the second serial communication protocol SCP2, the processing hardware 141 retrieves the set of command decode functions 122 and stores them in the command decode array 311 of the storage hardware 143.

Note further that the management system 110 includes telemetry data management hardware 341 and arbiter 325.

As its name suggests, the telemetry data management hardware 341 manages receipt of telemetry data 315 (such as one or more monitored power supply parameters including magnitude of the input voltage, magnitude of the output voltage 123, etc.). The telemetry data array 312 (such as one or more data fields) of storage hardware 143 stores status information associated with the power converter and/or power converter phases 165, power supply 135, controller 140, etc.

As its name suggests, the arbiter 325 provides the different entities such as processing hardware 141, controller 140, telemetry data management hardware 341, serial communication hardware 142, etc., controlled connectivity to the data stored in storage hardware 143. The controlled connectivity provides the entities access to the data associated with the command decode functions in the command decode array 311 as well as telemetry data array 312, log data array 313, etc.

Thus, in one embodiment, firmware executed by the processing hardware 141 populates the command descriptors (command decode functions) for the serial communication hardware to use. In further example embodiments, the firmware executed by the processing hardware 141 configures the various slave entities (such as telemetry data management hardware 341) to point to different locations in the storage hardware 143 for their data arrays and configuration.

In still further example embodiments, the arbiter 325 is a standard AHB (Advanced High-performance Bus) arbiter is used to determine who has priority to access the storage hardware 143 at different times.

At soft start of the power converter 165 producing the output voltage 123, the VID interface associated with the serial communication hardware 142-2 read from the CMD descriptors (command decode functions in storage hardware 143) to determine its support protocol and, on a per packet basis, using the command code offset as the index into the command array to determine acknowledge and rejection criteria.

In further example embodiments, a VID interface associated with the serial communication hardware 142 writes to the circular buffer log array (such as log data array 313) for each packet received to create a debug of the received packet stream for later use.

The telemetry data management hardware 341 (such as implementing DMA or Direct Memory Access) will read its descriptors at a fixed frequency and populate data fields of the telemetry data array 312 based on the telemetry source selected from the descriptor. In one embodiment, this requires a read modify write each period of update. The period of this update and the telemetry sources including gain and offset correction are controlled by firmware.

As previously discussed, a spare data array 314 is present in the storage hardware 143 for storage of data received from any suitable entity such as over the serial communication link 149. The received data stored in spare data array 314 can be targeted for use by any processing entity (such as specific firmware) in the management system 110 or other suitable entity associated with the power system 100.

Figure 4:
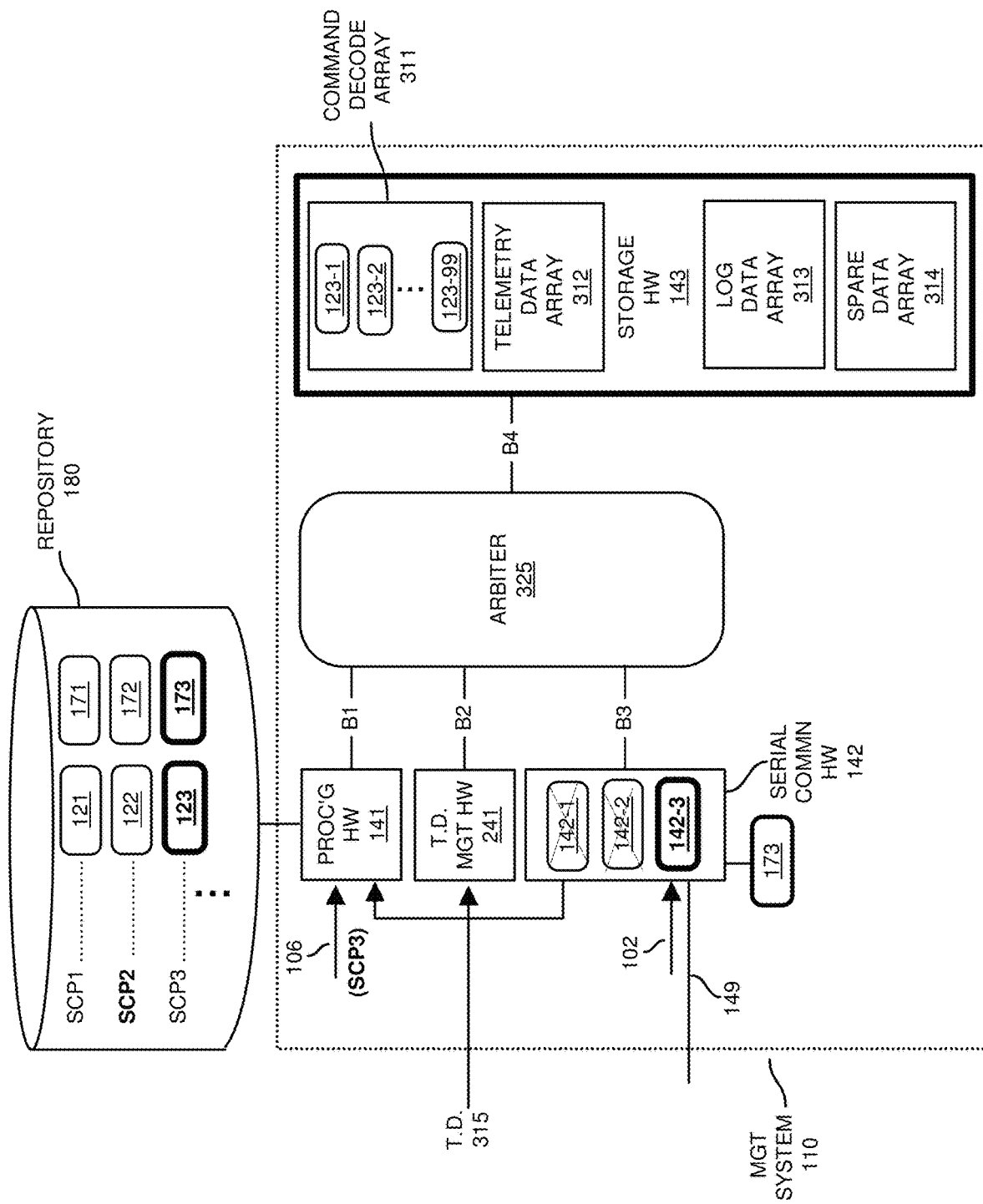
FIG. 4 is an example diagram illustrating detected selection of a third serial communication protocol and corresponding programming of serial communication hardware according to embodiments herein.

FIG. 4 is an example diagram illustrating detected selection of a third serial communication protocol and corresponding programming of serial communication hardware according to embodiments herein.

As previously discussed, embodiments herein include configuring the serial communication hardware 142 depending on the selected serial communication protocol as indicated by the control input 106.

In this example embodiment, assume that the control input 106 indicates selection of the serial communication protocol SCP3.

Based on the setting of input 106 indicating selection of the serial communication protocol SCP3, the processing hardware 141 implements serial communication hardware 142-3 because it supports processing and execution of the selected serial communication protocol SCP3. Additionally, because the serial communication protocol SCP3 is selected, the processing hardware 141 programs the selected serial communication hardware 142-3 to use map information 173. Map information 173 provides a mapping (translation) of received commands over the serial communication link 149 and serial communication hardware 142-3 to command decode functions 123 in the storage hardware 143.

Additionally, as previously discussed, in response to selection of the serial communication protocol SCP3, the processing hardware 141 retrieves the set of command decode functions 123 and stores them in the command decode array 311 of the storage hardware 143.

Figure 5:
FIG. 5 is an example diagram illustrating a command decode function according to embodiments herein.

FIG. 5 is an example diagram illustrating a command decode function according to embodiments herein.

In this example embodiment, the command decode function 123-2 is 32 bits in length. As previously discussed, each of the command decode functions is stored in the command decode array 311 and may be 32 bit in length or other suitable value. As further discussed below, each of the command decode functions stored in the command decode array 311 supports a different command received over the serial communication link.

In general, assume that the serial communication protocol SCP3 has been selected, via the map information 173 and the command decode functions 123, the serial communication hardware 142-3 translates and executes a received command via the appropriate command decode function in the storage hardware 143.

Figure 6:
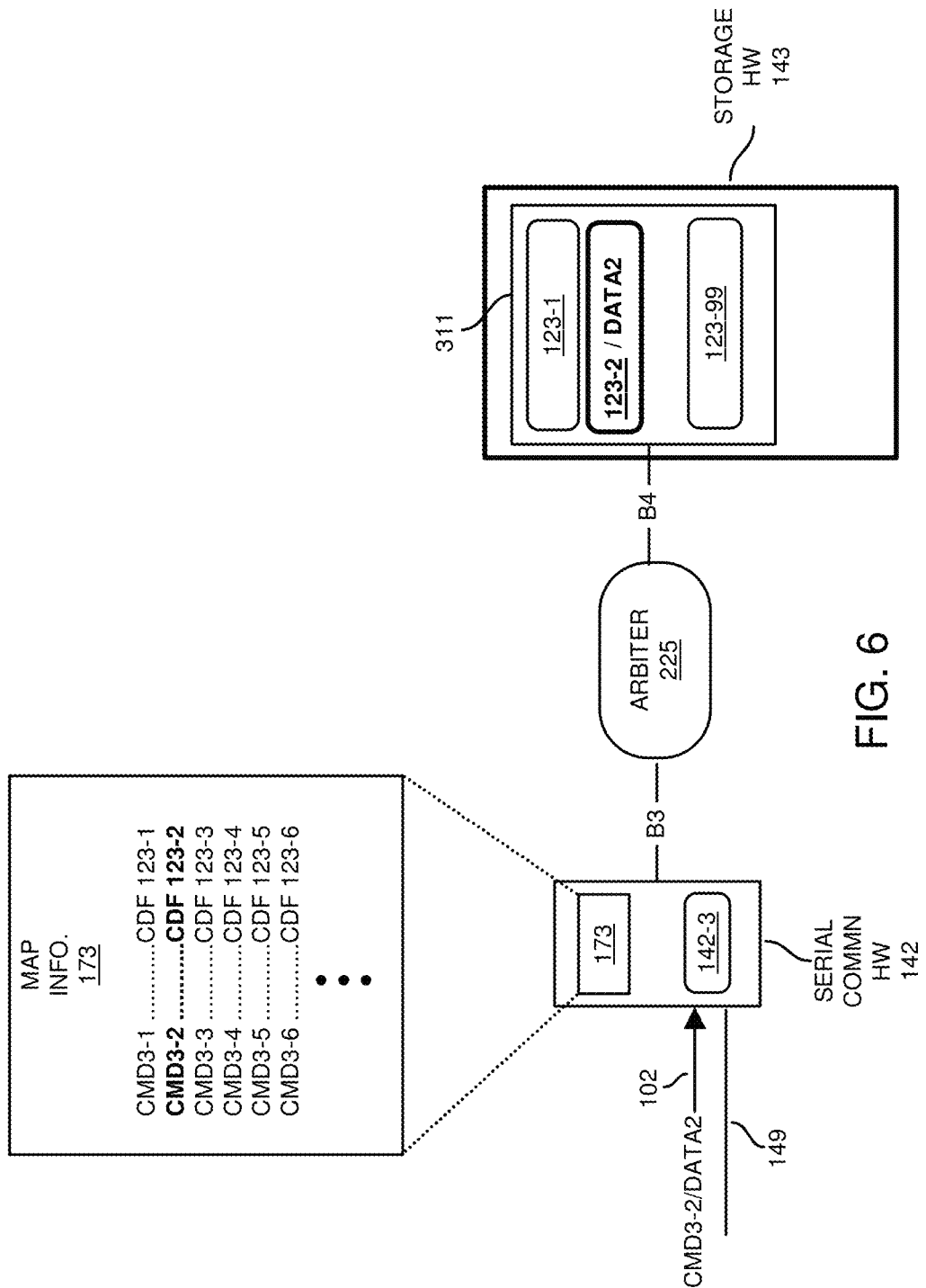
FIG. 6 is an example diagram illustrating receipt of a serial command, mapping of the serial command to a command decode function, and execution of the received command via the command decode function according to embodiments herein.

FIG. 6 is an example diagram illustrating receipt of a command, mapping of the command to a command decode function, and execution of the received command via the command decode function according to embodiments herein.

In this example embodiment, via generation of input 102, the load manager 118-M or other suitable entity communicates a command (such as CMD3-2 with corresponding data DATA2) over the serial communication link 149 to the serial communication hardware 142-3. In one embodiment, the received command CMD3-2 with corresponding data DATA2 is used to control operation of the power converter 165.

The received command CMD3-2 with corresponding data DATA2 is encoded in accordance with the serial communication protocol SCP3 implemented by the serial communication hardware 142-3.

In response to receiving the command CMD3-2 with corresponding data DATA2, the serial communication hardware 142-3 maps the command to a particular command decode function in the set of command decode functions 123 stored in the command decode array 311 in the storage hardware 143.

For example, via the map information 173, the serial communication hardware 142-3 determines that the command decode function 123-2 is used to execute the type of command CMD3-2. The serial communication hardware 142-3 executes the command CMD3-2 via the particular command decode function 123-2. In one embodiment, this includes the serial communication hardware 142-3 storing the data DATA2 in the data field 510 of the command decode function 123-2 stored in the command decode array 311 of the storage hardware 143.

Note that a respective command decode function itself may not store respective data associated with a received command. For example, in further example embodiments, the command decode function includes information (such as base address, offset, etc.) indicating a respective location in the storage hardware 143 or other location of a buffer external to storage hardware 143 in which to store the data received the command.

Figure 7:
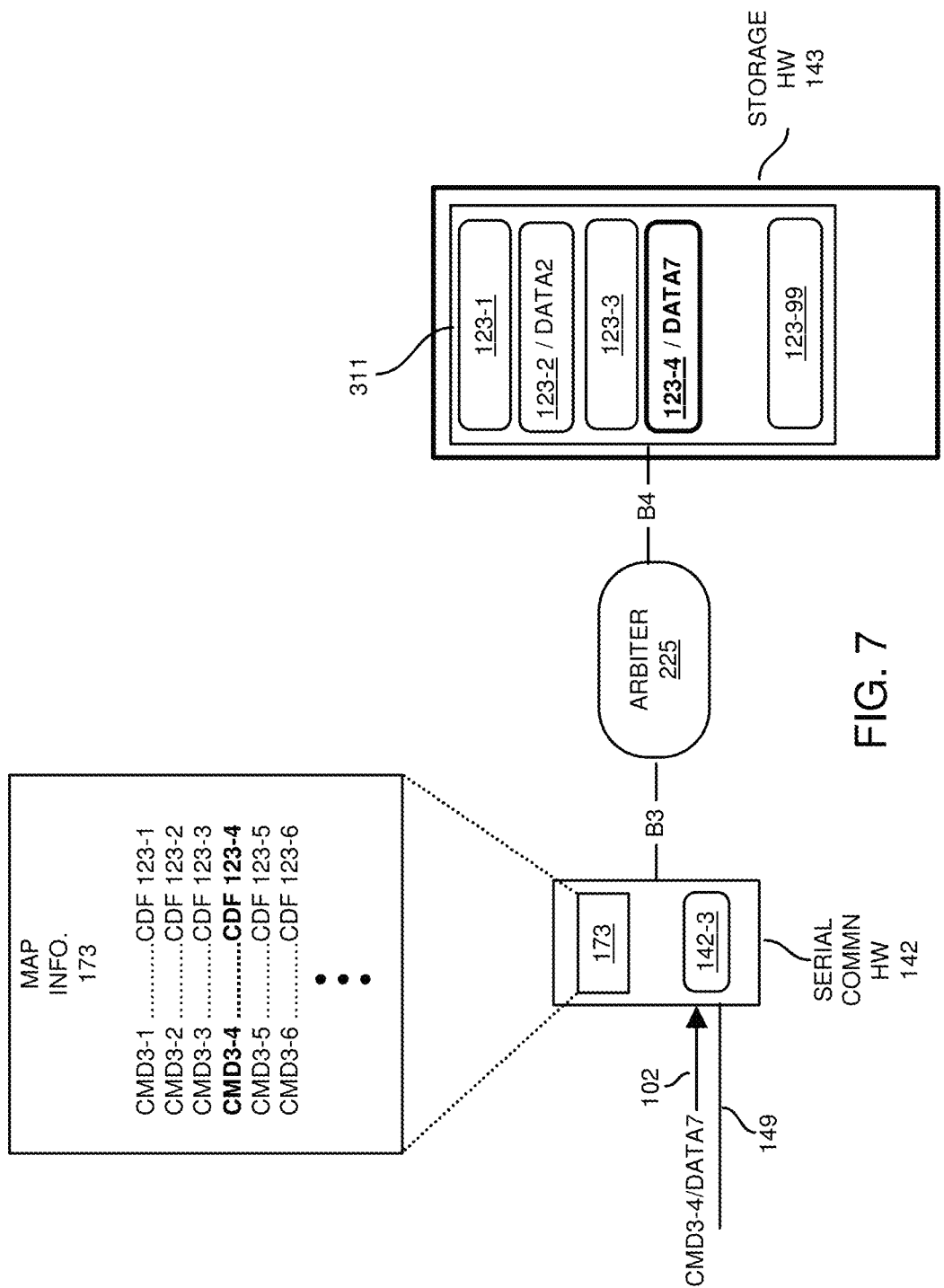
FIG. 7 is an example diagram illustrating receipt of a command, mapping of the command to a command decode function, and execution of the received command via the command decode function according to embodiments herein.

FIG. 7 is an example diagram illustrating communication flow associated with a selected serial communication protocol according to embodiments herein.

In this example embodiment, via generation of input 102, the load manager 118-M or other suitable entity communicates a command (such as CMD3-4 with corresponding data DATA7) over the serial communication link 149 to the serial communication hardware 142-3. In one embodiment, the received command CMD3-4 with corresponding data DATA7 is used to control operation of the power converter 165.

The received command CMD3-4 with corresponding data DATA7 is encoded in accordance with the serial communication protocol SCP3 implemented by the serial communication hardware 142-3.

In response to receiving the command CMD3-4 with corresponding data DATA7, the serial communication hardware 142-3 maps the command CMD3-4 to command decode function 123-4 in the set of command decode functions 123 stored in the command decode array 311 in the storage hardware 143.

For example, via the map information 173, the serial communication hardware 142-3 determines that the command decode function 123-4 is used to execute the type of command CMD3-4. The serial communication hardware 142-3 executes the command CMD3-4 via the particular command decode function 123-4. In one embodiment, this includes the serial communication hardware 142-3 storing the data DATA7 in a respective data field of the command decode function 123-4 stored in the command decode array 311 of the storage hardware 143.

Figure 8:
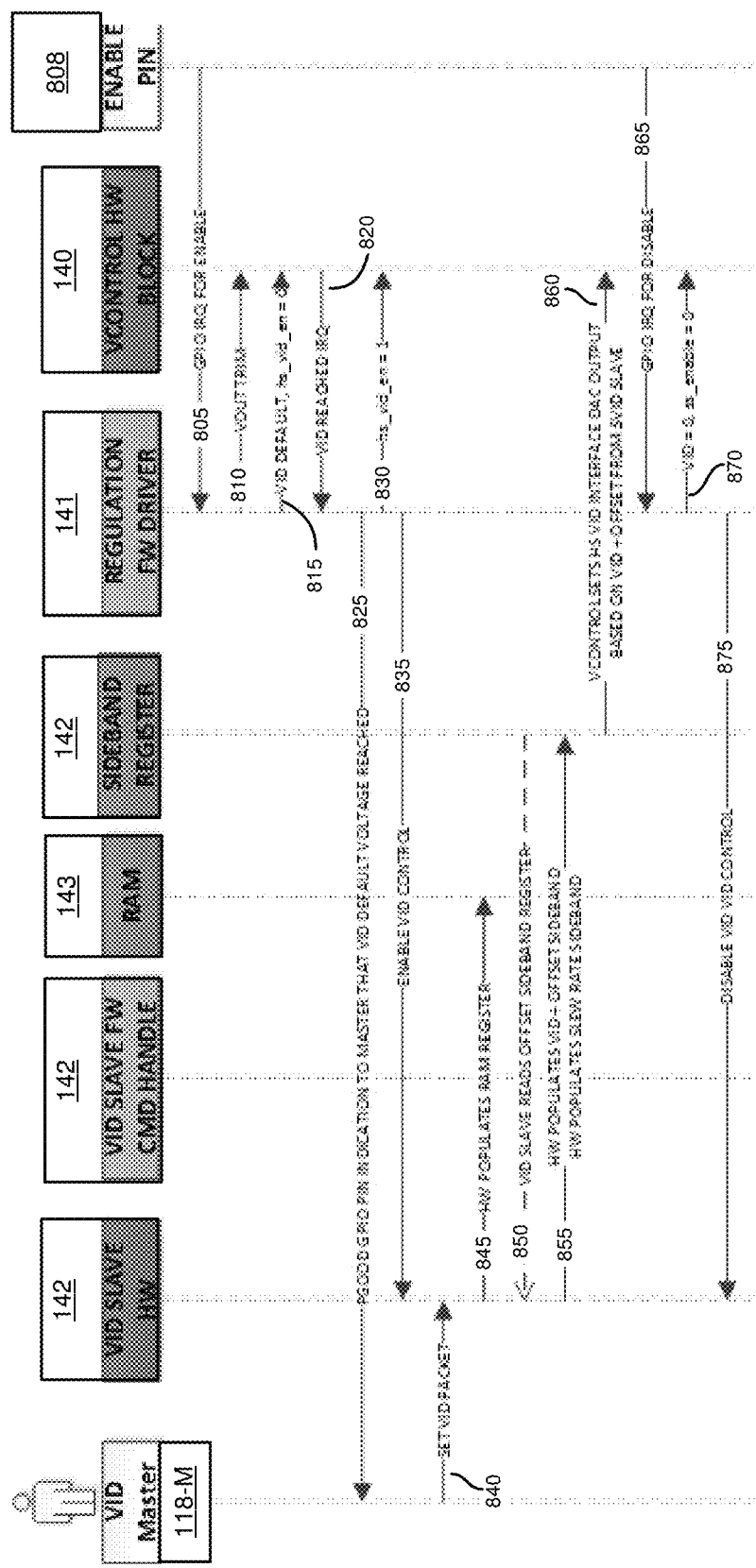
FIG. 8 is an example diagram illustrating communication flow associated with a selected serial communication protocol according to embodiments herein.

FIG. 8 is an example diagram illustrating communication flow associated with a selected serial communication protocol according to embodiments herein.

Via communications 805, the operator 808 enables operation of the power converter 165 via communication of an enable command.

Via communications 810, the processing hardware 141 provides output voltage 123 trim information to the controller 140 to control the power converter 165.

Via communications 815, the processing hardware 141 provides output voltage 123 default information to the controller 140.

Via communications 820, the controller 140 provides notification to the processing hardware 141 that the initial output voltage 123 has been reached.

Via communications 825, the processing hardware 141 provides notification to the load manager 118-M or other suitable entity that the output voltage 123 has reached the default magnitude.

Via communications 830, the processing hardware 141 provides a VID enable signal to the controller 140.

Via communications 835, the processing hardware 141 provides notification to the serial communication hardware that the voltage (VID) control of the power converter 165 has been enabled.

Via communications 840, the load manager 118-M or other suitable entity generates and communicates a set output voltage 123 command to the serial communication hardware 142 control a magnitude of the output voltage 123.

Via communications 845, using the received command and data, the serial communication hardware 142 populates an appropriate data field (register) in the storage hardware 143.

Via communications 850, the serial communication hardware 142 reads an offset sideband register.

Via communications 855, the serial communication hardware 142 populates the received VID value and offset sideband as well as populates a slew rate sideband.

Via communications 860, via the sub-band register, the serial communication hardware 142 (Vcontrol) sets the high speed VID interface digital-to-analog converter output based on the received VID and offset from SVID slave.

Via communications 865, the operator 808 generates and communicates an output voltage 123 disable notification to the processing hardware 141.

Via communications 870, the processing hardware 141 generates and communicates an output voltage 123 disable notification to the controller 140.

Via communications 875, the processing hardware 141 also provides notification to the serial communication hardware 142 that the VID programming/control has been disabled.

Figure 9:
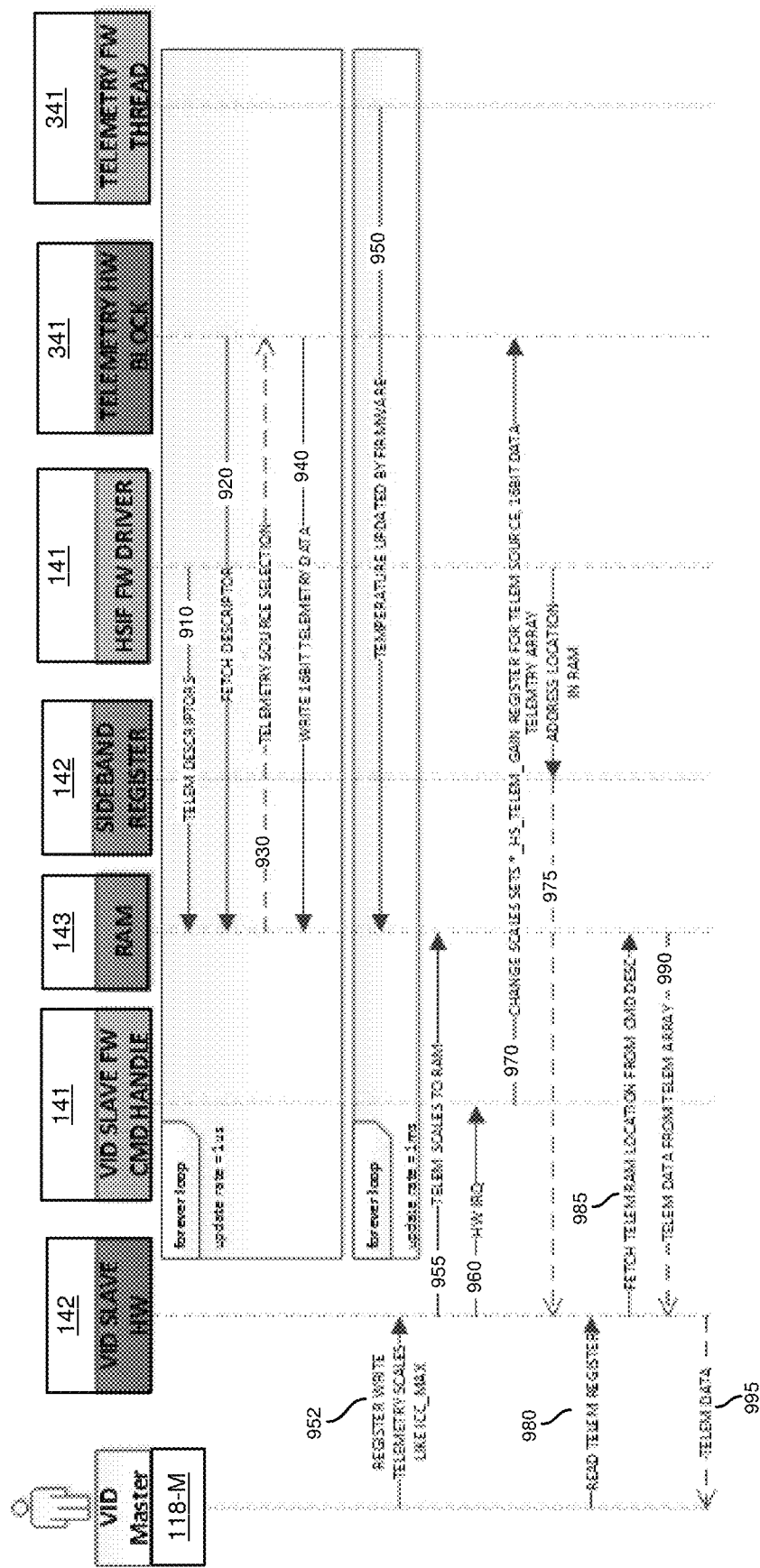
FIG. 9 is an example diagram illustrating communication flow associated with a selected serial communication protocol according to embodiments herein.

FIG. 9 is an example diagram illustrating communication flow associated with a selected serial communication protocol according to embodiments herein.

Via communications 910, the processing hardware 141 stores the telemetry data descriptors in the storage hardware 143.

Via communications 920, the telemetry data management hardware 341 fetches the descriptors stored in the storage hardware 143.

Via communications 930, the storage hardware 143 provides a telemetry source selection to the telemetry data management hardware 341.

Via communications 940, the telemetry data management hardware 341 writes received telemetry data (status information) associated with the power converter 165 to the appropriate location (such as telemetry data array 312) in storage hardware 143.

Via communications 950, the telemetry firmware thread communicates updated temperature information to the storage hardware 143.

Via communications 952, the load manager 118-M writes telemetry scales to the serial communication hardware 142.

Via communications 955, the serial communication hardware 142 stores the telemetry scales in storage hardware 143.

Via communications 960, the serial communication hardware 142 communicates an interrupt request to the processing hardware 141.

In response to the interrupt request, via communications 970, the processing hardware 141 provides notification of changing the telemetry data scales to the telemetry data management hardware 341.

Via communications 975, the processing hardware 141 provides notification of an address location in the storage hardware 143.

Via communications 980, the load manager 118-M sends a command to read a telemetry data register to the serial communication hardware 142.

Via communications 985, the serial communication hardware 142 fetches the requested data from the appropriate location in the storage hardware 143.

Via communications 990, the storage hardware 143 provides the requested telemetry data to the serial communication hardware 142.

Via communications 995, the serial communication hardware 142 provides the requested telemetry data to the load manager 118-M.

Figure 10:
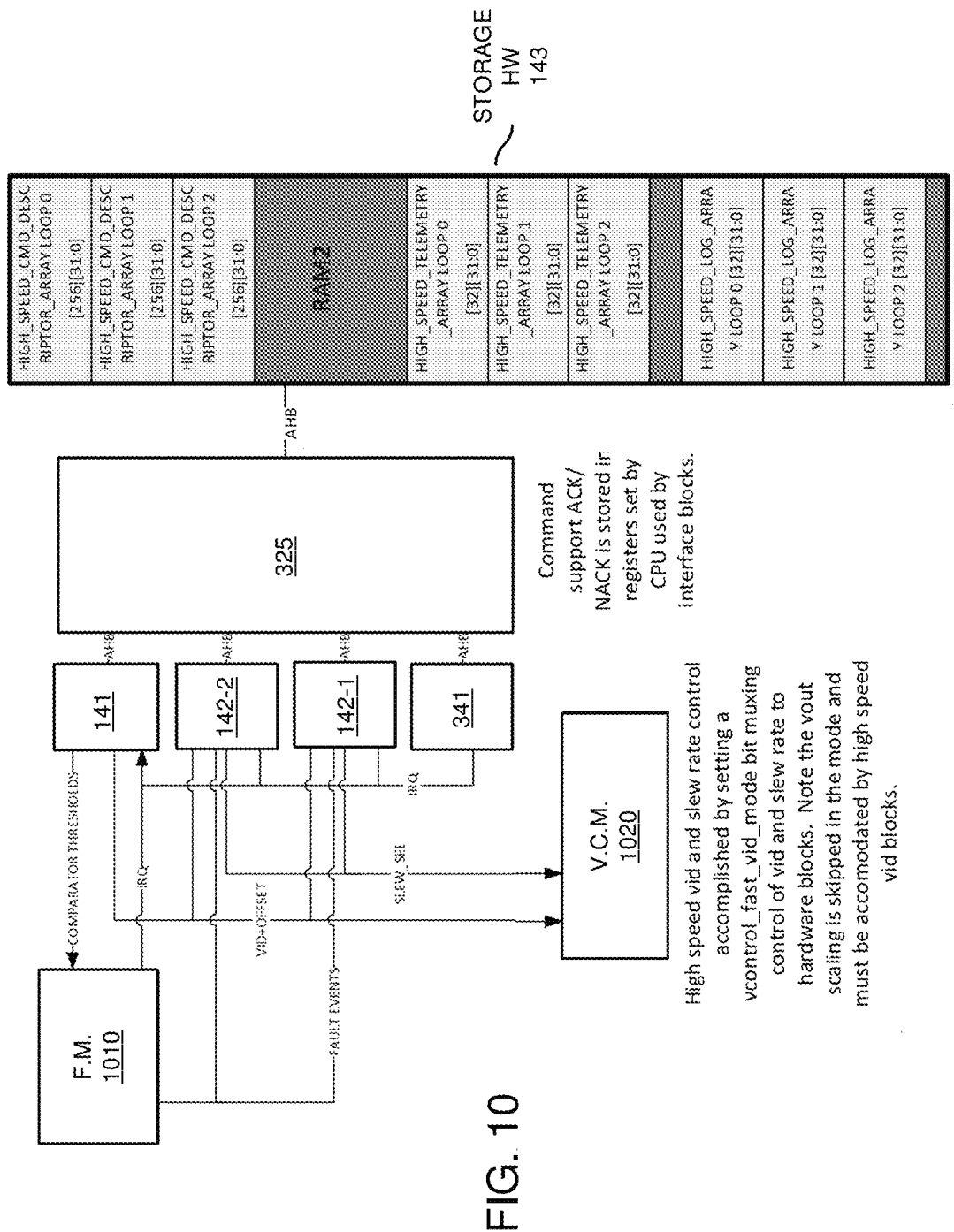
FIG. 10 is an example diagram illustrating storage allocation and implementation of fault processing according to embodiments herein.

FIG. 10 is an example diagram illustrating storage allocation and implementation of fault processing according to embodiments herein.

Further embodiments herein include high speed voltage control and fault monitoring via fault manager 1010 without firmware intervention.

To cover higher speed paths like faults, slew rate, and output voltage control, so-called sideband buses are used to transfer data to offload microcontroller bandwidth.

In one embodiment, the sideband bus includes information that the voltage controller manager 1020 uses to set the output voltage 123 and corresponding slew rate at which it should transition between set points.

The firmware executed by processing hardware 141 is used to change aspects of the VID such as scaling, trim, and offset correction or in manual firmware control mode, but does so at a nearly static update rate.

The telemetry data management hardware 341 (i.e., digital telemetry DMA block) automatically updates store status information independently of the firmware after is has been configured. In one embodiment, the firmware executed by the processing hardware 141 then only needs to intervene on an RTOS tick basis to update firmware based telemetry.

In one embodiment, the log data array 313 is a circular buffer. If firmware does not read the respective data stored in the log data array, the log data array will be overwritten with new log data.

Figure 11:
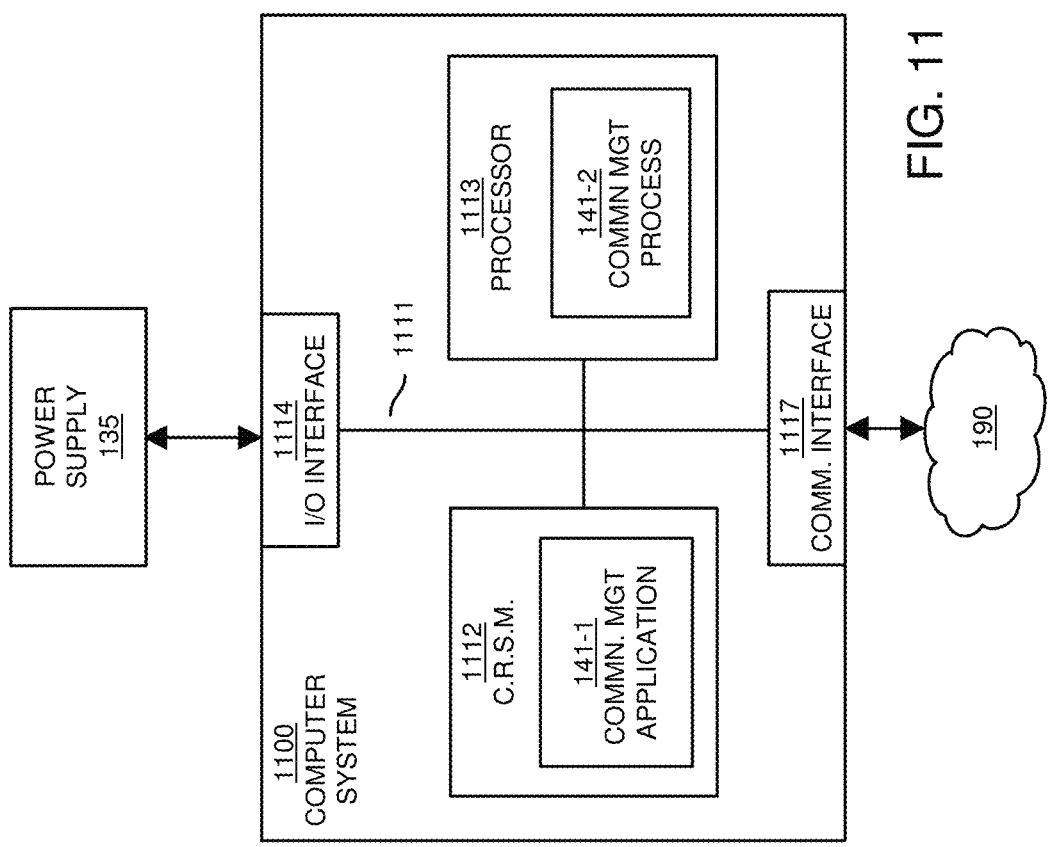
FIG. 11 is an example diagram illustrating computer processor hardware and related software instructions that execute methods according to embodiments herein.

FIG. 11 is an example block diagram of a computer device for implementing any of the operations as discussed herein according to embodiments herein.

As shown, computer system 1100 (such as implemented by any of one or more resources such as processing hardware 141, telemetry data management hardware 241, serial communication hardware, controller 140, etc.) of the present example includes an interconnect 1111 that couples computer readable storage media 1112 such as a non-transitory type of media (or hardware storage media) in which digital information can be stored and retrieved, a processor 1113 (e.g., computer processor hardware such as one or more processor devices), I/O interface 1114, and a communications interface 1117.

I/O interface 1114 provides connectivity to any suitable circuitry such as controller 140, load 118, etc.

Computer readable storage medium 1112 can be any hardware storage resource or device such as memory, optical storage, hard drive, floppy disk, etc. In one embodiment, the computer readable storage medium 1112 stores instructions and/or data used by the processing hardware 141 to perform any of the operations as described herein.

Further in this example embodiment, communications interface 1117 enables the computer system 1100 and processor 1113 to communicate over a resource such as network 190 to retrieve information from remote sources and communicate with other computers.

As shown, computer readable storage media 1112 is encoded with communication management manager application 141-1 (e.g., software, firmware, etc.) executed by processor 1113 (such as processing hardware 141, serial communication hardware 142, etc.). Communication management application 141-1 can be configured to include instructions to implement any of the operations as discussed herein.

During operation of one embodiment, processor 1113 accesses computer readable storage media 1112 via the use of interconnect 1111 in order to launch, run, execute, interpret or otherwise perform the instructions in soft communication management application 141-1 stored on computer readable storage medium 1112.

Execution of the communication management application 141-1 produces processing functionality such as communication management process 141-2 in processor 1113. In other words, the communication management process 141-2 associated with processor 1113 represents one or more aspects of executing communication management application 141-1 within or upon the processor 1113 in the computer system 1100.

In accordance with different embodiments, note that computer system 1100 (any of the hardware components as discussed herein can be a micro-controller device, logic, hardware processor, hybrid analog/digital circuitry, etc., configured to facilitate control of the power system 100 and perform any of the operations as described herein.

Functionality supported by the different resources will now be discussed via flowchart in FIG. 12. Note that the steps in the flowcharts below can be executed in any suitable order.

Figure 12:
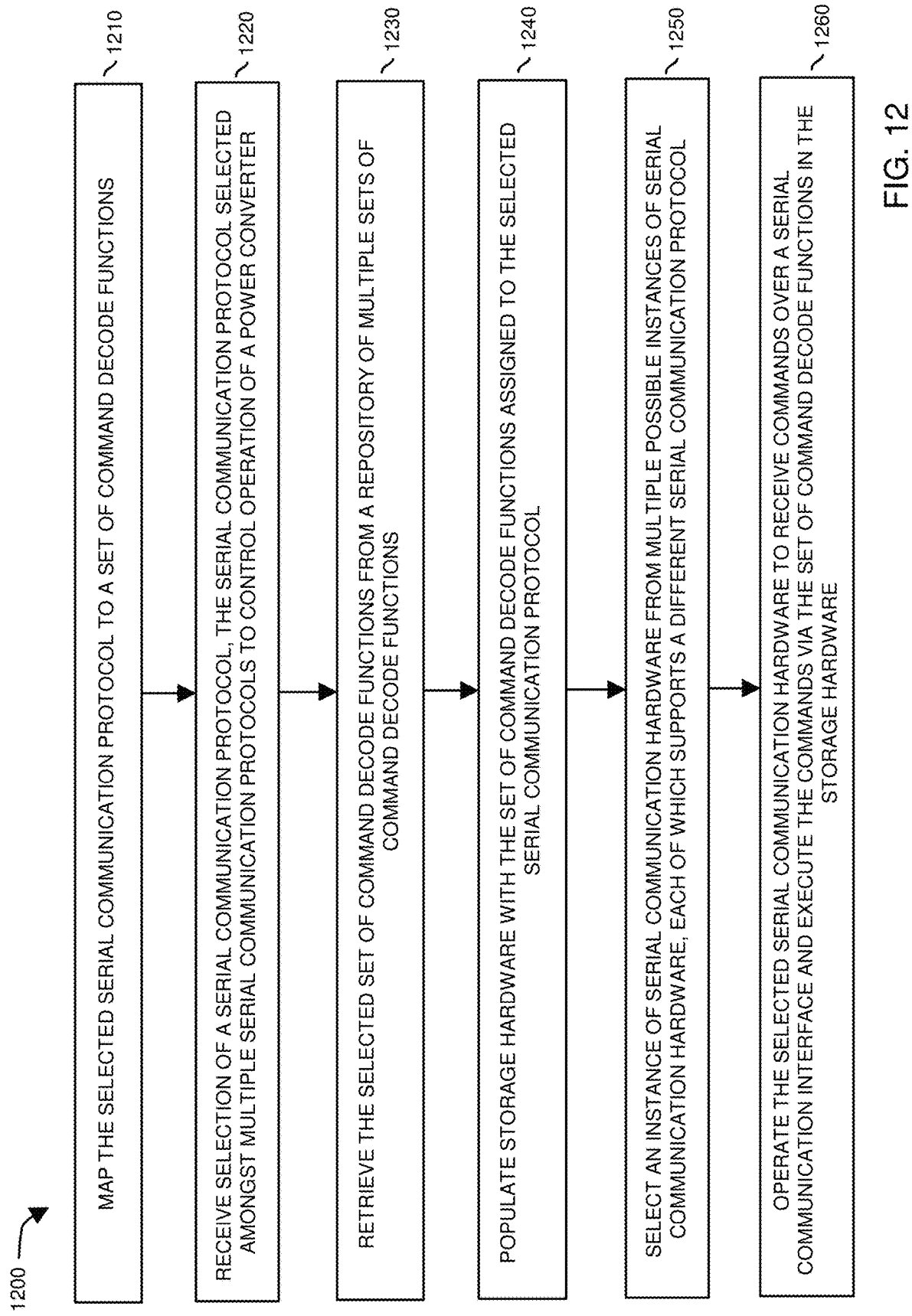
FIG. 12 is an example diagram illustrating a method according to embodiments herein.

FIG. 12 is an example diagram illustrating a method of controlling a power converter according to embodiments herein.

In processing operation 1210, the processing hardware 141 or other suitable entity associated with management system 110 receives selection of a serial communication protocol (such as SCP2) such as via input 106. The serial communication protocol (SCP2) is selected amongst multiple serial communication protocols (such as SCP1, SCP2, SCP3, etc.) to control operation of the power converter 165.

In processing operation 1220, the processing hardware 141 maps the selected serial communication protocol (SCP2) to a set of command decode functions 122.

In processing operation 1230, the processing hardware 141 retrieves the selected set of command decode functions 122 from the repository 180, which stores multiple sets of command decode functions 121, 122, 123, etc.

In processing operation 1240, the processing hardware 141 populates storage hardware 143 and corresponding command decode array 311 (pre-allocated storage capacity) with the set of command decode functions SC2 assigned to the selected serial communication protocol SCP2.

In processing operation 1250, the processing hardware 141 selects an instance of serial communication hardware 142-2 from multiple possible instances of serial communication hardware (142-1, 142-2, 142-3, etc.). As previously discussed, each of the instances of serial communication hardware supports a different serial communication protocol.

In processing operation 1260, the selected serial communication hardware 142-2 receives commands (input 102) over the serial communication interface 147 (serial communication link 149) and executes the commands via the set of command decode functions 122 in the storage hardware 143.

FIG. 13 is an example diagram illustrating assembly of a power converter circuit on a circuit board according to embodiments herein.

In this example embodiment, assembler 1340 receives a substrate 1310 (such as a circuit board).

The assembler 1340 affixes (couples) the management system 110 (and corresponding components such as processing hardware 141, serial communication hardware 142, and storage hardware 143), dynamic load 118, and power supply 135 (and corresponding components such as controller 140, power converter 165, etc.) to the substrate 1310.

Via circuit paths 1320 (such as one or more traces, electrical conductors, cables, wires, etc.), the assembler 1340 couples the management system 110 and corresponding components to the power supply 135.

Via circuit paths 1321 (such as one or more traces, electrical conductors, cables, wires, etc.), the assembler 1340 couples the controller 140 to the power converter 165. Note that components such as the controller 140, power converter 165, and corresponding components such as processing hardware 141, serial communication hardware 142, and storage hardware 143, etc., associated with the power supply 135 can be affixed or coupled to the substrate 1310 in any suitable manner. For example, one or more of the components in power system 100 can be soldered to the substrate, inserted into sockets disposed on the substrate 1310, etc.

Note further that the substrate 1310 is optional. Circuit paths 1320, 1321, 1322, etc., may be disposed in cables providing connectivity between the different components such as between power supply 135 and the load 118.

In one nonlimiting example embodiment, the dynamic load 118 is disposed on its own substrate independent of substrate 1310; the substrate of the dynamic load 118 is directly or indirectly connected to the substrate 1310. Components of the management system 110, controller 140, or any portion of the power supply 135 can be disposed on a standalone smaller board plugged into a socket of the substrate 1310.

In further example embodiments, via one or more circuit paths 1322 (such as one or more traces, cables, connectors, wires, conductors, electrically conductive paths, etc.), the assembler 1340 couples the power converter 165 to the load 118. In one embodiment, the circuit path 1322 conveys the output voltage 123 (and corresponding output current) generated from the power converter 165 to the load 118.

Accordingly, embodiments herein include a system comprising: a substrate 1310 (such as a circuit board, standalone board, mother board, standalone board destined to be coupled to a mother board, host, etc.); management system 110 such as processing hardware 141, serial communication hardware 142, storage hardware 143, etc.; a power converter 165 including corresponding components as described herein; and a dynamic load 118. As previously discussed, the dynamic load 118 is powered based on conveyance of output voltage 123 and corresponding current conveyed over one or more circuit paths 1322 from the power converter 165 to the dynamic load 118.

Note that the dynamic load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1310 or disposed at a remote location.

Note again that techniques herein are well suited for use in circuit applications such as those that implement power conversion and control via a respective serial communication protocol. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   processing hardware operative to receive input indicating selection of a serial communication protocol, the serial communication protocol selected amongst multiple serial communication protocols;
   the processing hardware further operative to configure serial communication hardware based on the selected serial communication protocol, the serial communication hardware operative to receive commands conveyed over a serial communication link, the commands configured to control operation of a power converter;
   storage hardware populated with a first set of command decode functions, the first set of command decode functions assigned to the selected serial communication protocol; and
   the serial communication hardware operative to execute the received commands via the first set of command decode functions in the storage hardware;
   wherein the serial communication hardware is operable to receive a first command over the serial communication link, the first command conveyed over the serial communication link to the serial communication hardware in accordance with the selected serial communication protocol, the apparatus further comprising:
   an arbiter disposed between the serial communication hardware and the storage hardware storing the first set of command decode functions assigned to the selected serial communication protocol;
   wherein the arbiter is further operable to: i) via the first set of command decode functions and corresponding map information associated with the first set of command decode functions, map the received first command into a first power converter command, and ii) execute the first power converter command to control operation of the power converter.

2. The apparatus as in claim 1, wherein the processing hardware is operative to:
   retrieve the first set of command decode functions from a repository of multiple sets of command decode functions.

3. The apparatus as in claim 2, wherein each of the multiple sets of command decode functions supports a different serial communication protocol of the multiple serial communication protocols.

4. The apparatus as in claim 1, wherein the commands communicated over the serial communication link are encoded in accordance with the selected serial communication protocol, the commands generated to control operation of the power converter.

5. The apparatus as in claim 1 further comprising:
   a repository operative to store multiple sets of command decode functions, each set of the command decode functions in the repository associated with a different serial communication protocol selectable for storage in the storage hardware.

6. The apparatus as in claim 1, wherein the processing hardware is further operative to:
   select the serial communication hardware from multiple instances of serial communication hardware, each of which supports a different serial communication protocol of the multiple serial communication protocols.

7. The apparatus as in claim 1, wherein the arbiter is operative to provide access to data associated with the first set of command decode functions to multiple entities including the serial communication hardware.

8. The apparatus as in claim 1, further comprising:
   telemetry storage hardware operative to store status information associated with the power converter in data fields of the storage hardware.

9. The apparatus as in claim 1, wherein a portion of the storage hardware is pre-selected to store one of multiple sets of command decode functions, the first set of command decode functions selected from the multiple sets, each of the multiple sets of command decode functions supporting execution of commands associated with a different serial communication protocol.

10. The apparatus as in claim 1, wherein the storage hardware is volatile memory.

11. The apparatus as in claim 1, wherein the serial communication hardware is further operative to initiate storage of data received in the first command in a data field of a particular command decode function of the multiple command decode functions, the data operative to control the operation of the power converter.

12. The apparatus as in claim 1, wherein the commands conveyed over the serial communication link are generated by a load management function controlling operation of the power converter, the load management function operable to communicate the commands over the serial communication link to the serial communication hardware.

13. The apparatus as in claim 12, wherein the power converter is operative to supply power to a load based on power converter settings as specified by the commands conveyed over the serial communication link from the load management function to the serial communication hardware.

14. The apparatus as in claim 1, wherein the selected serial communication protocol is selected based on a protocol supported by a load management function managing supply of power from the power converter to a load;
    wherein the serial communication hardware is operative to communicate control information to the power converter based on decoding of the commands conveyed over the serial communication link to the serial communication hardware, the commands generated by the load management function.

15. The apparatus as in claim 1, wherein the power converter is operative to supply power to a load based on the commands conveyed over the serial communication link to the serial communication hardware.

16. The apparatus as in claim 15, wherein the serial communication hardware is operative to map commands associated with different serial communication protocols to common data stored in the storage hardware; and
    wherein the serial communication hardware is further operative to use the common data to generate control information to control operation of the power converter supplying the power to the load.

17. The apparatus as in claim 1, wherein communications conveyed over the serial communication link include current operational conditions associated with the power converter generating an output voltage to power a load.

18. The apparatus as in claim 1, wherein communications received over the serial communication link at the serial communication hardware control a respective magnitude of an output voltage generated by the power converter to power a load.

19. The apparatus as in claim 1, wherein the selected serial communication protocol is a first serial communication protocol of the multiple serial communication protocols;
    wherein the serial communication hardware includes: i) a first serial communication hardware portion operative to support the first serial communication protocol, and ii) second serial communication hardware portion operative to support a second serial communication protocol of the multiple serial communication protocols; and
    wherein configuration of the serial communication hardware based on the selected serial communication protocol includes activation of the first serial communication hardware portion to process the received commands, the received commands encoded in accordance with the first serial communication protocol.

20. The apparatus as in claim 1, wherein the serial communication hardware is operative to use common data to control operation of the power converter; and
    wherein the serial communication hardware is operative to execute the commands via mapping of each of the received commands to a corresponding decode function in the first set of command decode functions.

21. The apparatus as in claim 1, wherein the input is received from a source other than through the serial communication hardware.

22. A method comprising:
    receiving input indicating selection of a serial communication protocol, the serial communication protocol selected amongst multiple serial communication protocols;
    configuring serial communication hardware based on the selected serial communication protocol, the serial communication hardware operative to receive commands conveyed over a serial communication link, the commands configured to control operation of a power converter;
    populating storage hardware with a first set of command decode functions, the first set of command decode functions assigned to the selected serial communication protocol;
    configuring the serial communication hardware to receive the commands over the serial communication link;
    executing the received commands via the set of command decode functions in the storage hardware;
    wherein executing the received commands includes:
        receiving a first command over the serial communication link, the first command conveyed over the serial communication link to the serial communication hardware in accordance with the selected serial communication protocol;
        via an arbiter disposed between the serial communication hardware and the storage hardware, storing the first set of command decode functions assigned to the selected serial communication protocol;
        via the arbiter: i) via the first set of command decode functions and corresponding map information associated with the first set of command decode functions, mapping the received first command into a first power converter command, and ii) executing the first power converter command to control operation of the power converter.

23. The method as in claim 22, wherein populating the storage hardware includes:
    mapping the selected serial communication protocol to the first set of command decode functions; and
    retrieving the first set of command decode functions from a repository of multiple sets of command decode functions.

24. The method as in claim 23, wherein each of the multiple sets of command decode functions supports a different serial communication protocol of the multiple serial communication protocols.

25. The method as in claim 22, wherein the received commands are encoded in accordance with the selected serial communication protocol to control operation of the power converter.

26. The method as in claim 22 further comprising:
    storing multiple sets of command decode functions in a repository, each set of the command decode functions associated with a different serial communication protocol selectable for storage in the storage hardware.

27. The method as in claim 22 further comprising:
    selecting the serial communication hardware from multiple instances of serial communication hardware, each of which supports a different serial communication protocol.

28. The method as in claim 22 further comprising:
    implementing the arbiter to provide connectivity between the serial communication hardware and the storage hardware.

29. The method as in claim 28, wherein the arbiter is operative to provide access to data associated with the command decode functions to multiple entities including the serial communication hardware.

30. An apparatus comprising:
- processing hardware operative to receive input indicating selection of a serial communication protocol, the serial communication protocol selected amongst multiple serial communication protocols;
- the processing hardware further operative to configure serial communication hardware based on the selected serial communication protocol, the serial communication hardware operative to receive commands conveyed over a serial communication link, the commands configured to control operation of a power converter;
- storage hardware populated with a first set of command decode functions, the first set of command decode functions assigned to the selected serial communication protocol; and
- the serial communication hardware operative to execute the received commands via the first set of command decode functions in the storage hardware;
- wherein the serial communication hardware is operable to receive a first command over the serial communication link, the first command conveyed over the serial communication link to the serial communication hardware in accordance with the selected serial communication protocol;
- the apparatus further comprising: an arbiter disposed between the serial communication hardware and the storage hardware storing the first set of command decode functions assigned to the selected serial communication protocol;
- wherein the arbiter is further operable to: i) receive the first command, the first command generated by a management resource controlling operation of the power converter; ii) via the first set of command decode functions and corresponding map information associated with the first set of command decode functions, translate the received first command into a first power converter command; and iii) execute the first power converter command to control operation of the power converter.

* * * * *